United States Patent [19]

Lunder

[11] Patent Number: 5,678,802
[45] Date of Patent: Oct. 21, 1997

[54] CABLE GUIDE CASING APPARATUS

[75] Inventor: Dennis Lunder, Chula Vista, Calif.

[73] Assignee: Valterra Products, Inc., San Fernando, Calif.

[21] Appl. No.: 554,090

[22] Filed: Nov. 6, 1995

[51] Int. Cl.⁶ ............................................. F16K 31/46
[52] U.S. Cl. .................................. 251/294; 137/899
[58] Field of Search ........................... 251/293, 294; 74/500.5, 502.4; 137/899

[56] References Cited

U.S. PATENT DOCUMENTS

| | | | |
|---|---|---|---|
| 1,710,488 | 4/1929 | Oliphant | 251/294 X |
| 3,015,469 | 1/1962 | Falk | 251/294 X |
| 3,954,250 | 5/1976 | Grace | 251/294 X |
| 4,203,468 | 5/1980 | Dietz | 251/294 X |
| 4,875,504 | 10/1989 | Nicholson | 137/899 |
| 4,907,676 | 3/1990 | Shirdavani | 251/294 X |
| 5,439,198 | 8/1995 | Reed | 137/899 X |
| 5,445,190 | 8/1995 | Gunder | 137/899 |

*Primary Examiner*—John Rivell
*Attorney, Agent, or Firm*—Rapkin, Gitlin & Moser

[57] ABSTRACT

A gate valve having a valve housing with an upper housing member, and a lower housing member, which contains a flow passageway. A valve closure device with a valve stem is moveable transversely of the flow passageway between the upper housing member, to cause the passageway to open, and the lower housing member, to cause the passageway to close. An axially moveable sleeve covered cable, which is connected to the valve closure device at the valve stem, is provided to impart movement to the valve closure device. A clamp assembly which includes identical cooperating members adapted to align in opposing relationship to engage and secure the upper housing and the cable and cable sleeve between them enables the cable to be operated from a remote and convenient location outside the recreational vehicle at any desired angle of bend to engage the valve closure device to cause it to move easily and effectively back and forth within the valve housing.

2 Claims, 3 Drawing Sheets ic apparatus..."

CABLE GUIDE CASING APPARATUS

BACKGROUND OF THE INVENTION

1. Field of the Invention

This invention relates generally to the field of gate valves and, more particularly, to a device that is employed in conjunction with recreational vehicles and the like to enhance and improve the capability of the cable actuator, which is used to manipulate the gate inside the valve opening to control waste disposal.

2. Description of the Prior Art

Gate valves have a variety of applications, including their use in conjunction with recreational vehicle holding tanks that contain solid and liquid waste materials. Manual or electrically operated gate valves include a valve body in which a gate is actuated by a wire cable connected to a valve stem extending from the gate. For manual operation, the cable is generally attached to a handle, which can be manipulated forwards or backwards to move the gate in and out of the valve opening. In situations where the tank is mounted under the body of the vehicle and the valve employs a handle actuated cable with a short throw, it is relatively easy to operate the valve to open and close it. The drawback involves the need to get low to the ground beneath the vehicle, possibly even on your hands and knees or on your back, to maneuver in close enough to the handle to operate the valve.

Placing a high value on convenience in these situations, valves of the sort being discussed here are now more likely to be operated from a remote location, usually somewhere outside the vehicle mounted on a control panel together with water and electrical connections. The drawback, in this situation, regards the problem in employing a cable to effectively operate the valve, when the cable and handle are not substantially in alignment with the valve stem and valve gate. What occurs, in this instance, is the difficulty in smoothly and efficiently communicating a force to the cable to enable it to immediately and effectively open and close the valve. What normally happens here is that the cable can become stuck simply because it lacks the necessary axial forces required to push and pull the gate open and closed. Because the portion of the cable nearest to the valve stem has no substantial support or rigidity, the cable section located between the stem and the handle also can tend to become slack and weak and, thus, ineffectual. This typically results in a disruption of the axial forces that would otherwise be produced through the cable and communicated to the gate upon activation at the handle end.

The improvement of the present invention provides the means to reliably operate a cable actuated gate valve from a remote location by ensuring the application of a constant force axially generated through the cable body to cause the gate to open and close efficiently.

SUMMARY OF THE INVENTION

A gate valve is provided having a valve housing with an upper housing member, including a top surface and first and second sidewalls, and a lower housing member. Contained within the lower housing member is a flow passageway. A valve closure device with a valve stem is moveable transversely of the flow passageway between the upper housing member, to cause the passageway to open, and the lower housing member, to cause the passageway to close. An axially moveable cable, which is connected to the valve closure device at the valve stem, is provided to impart movement to the valve closure device. A sleeve covers a large portion of the cable to provide strength to and a protective covering for the cable within. In conjunction with the foregoing, the present invention provides the improvement comprising a clamp assembly, including identical cooperating members adapted to align in opposing relationship to engage and secure the upper housing and the cable and cable sleeve between them. Thus, the cable can be operated from a remote and convenient location outside the vehicle at any desired angle of bend to engage the valve closure device to cause it to move easily and effectively back and forth within the valve housing.

Accordingly, an object of the present invention is to provide a cable guide casing in conjunction with a cable actuated gate valve assembly for enabling the remote and efficient operation of the gate within the gate valve housing.

Another object of the present invention is to provide a cable guide casing in conjunction with a cable actuated gate valve assembly for enabling the remote and efficient operation of the gate employing a cable of any desired reasonable length.

Still another object of the present invention is to provide a cable guide casing in conjunction with a cable actuated gate valve assembly for enabling the remote and efficient operation of the gate employing a cable with any desired angle of bend.

Yet another object of the present invention is to provide a cable guide casing in conjunction with a cable actuated gate valve assembly that is easy and efficient to use.

Still yet another object of the present invention is to provide a cable guide casing in conjunction with a cable actuated gate valve assembly that is easy and cost effective to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
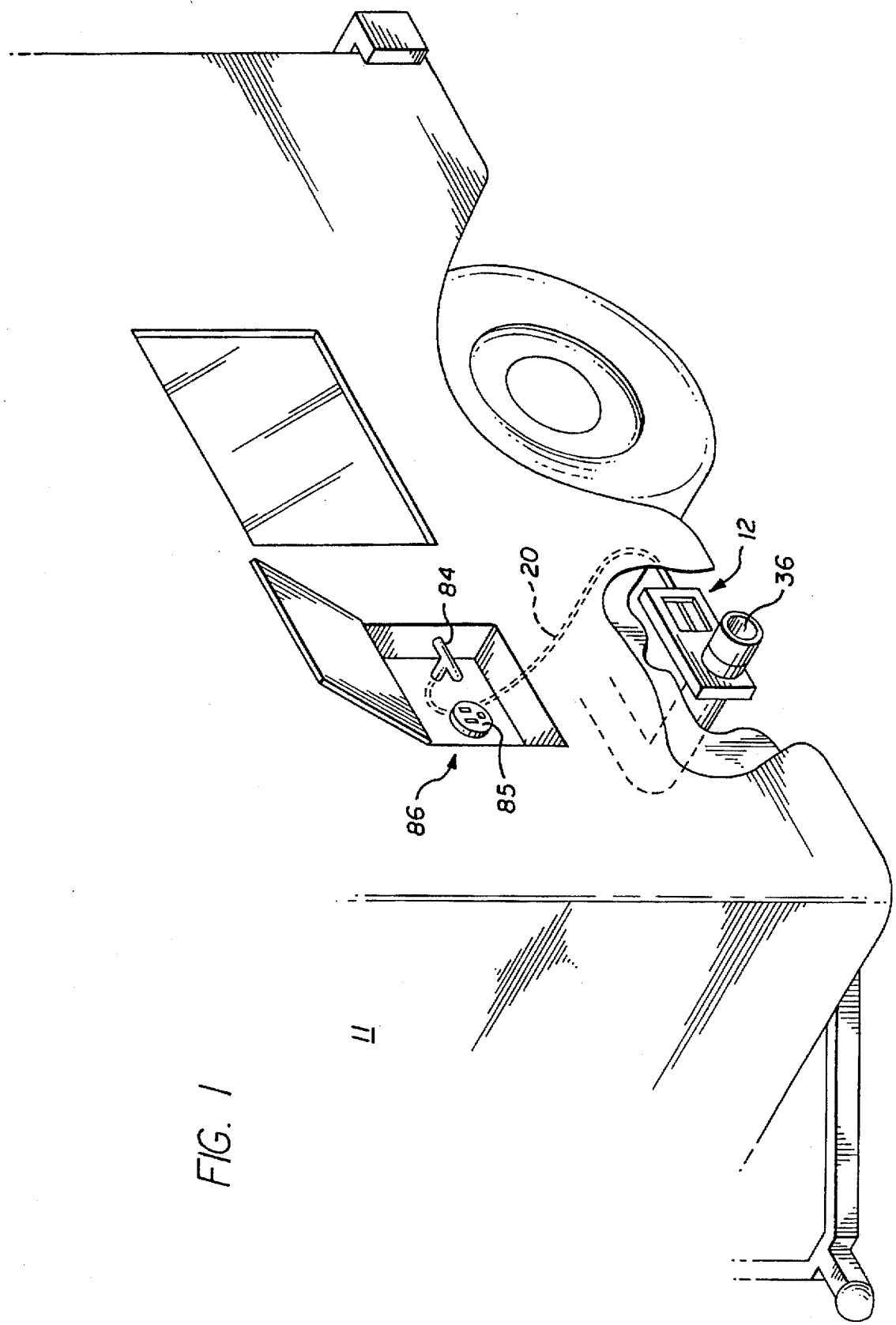
FIG. 1 is a perspective view of a recreational vehicle employing the cable guide casing apparatus of the present invention.
Figure 2:
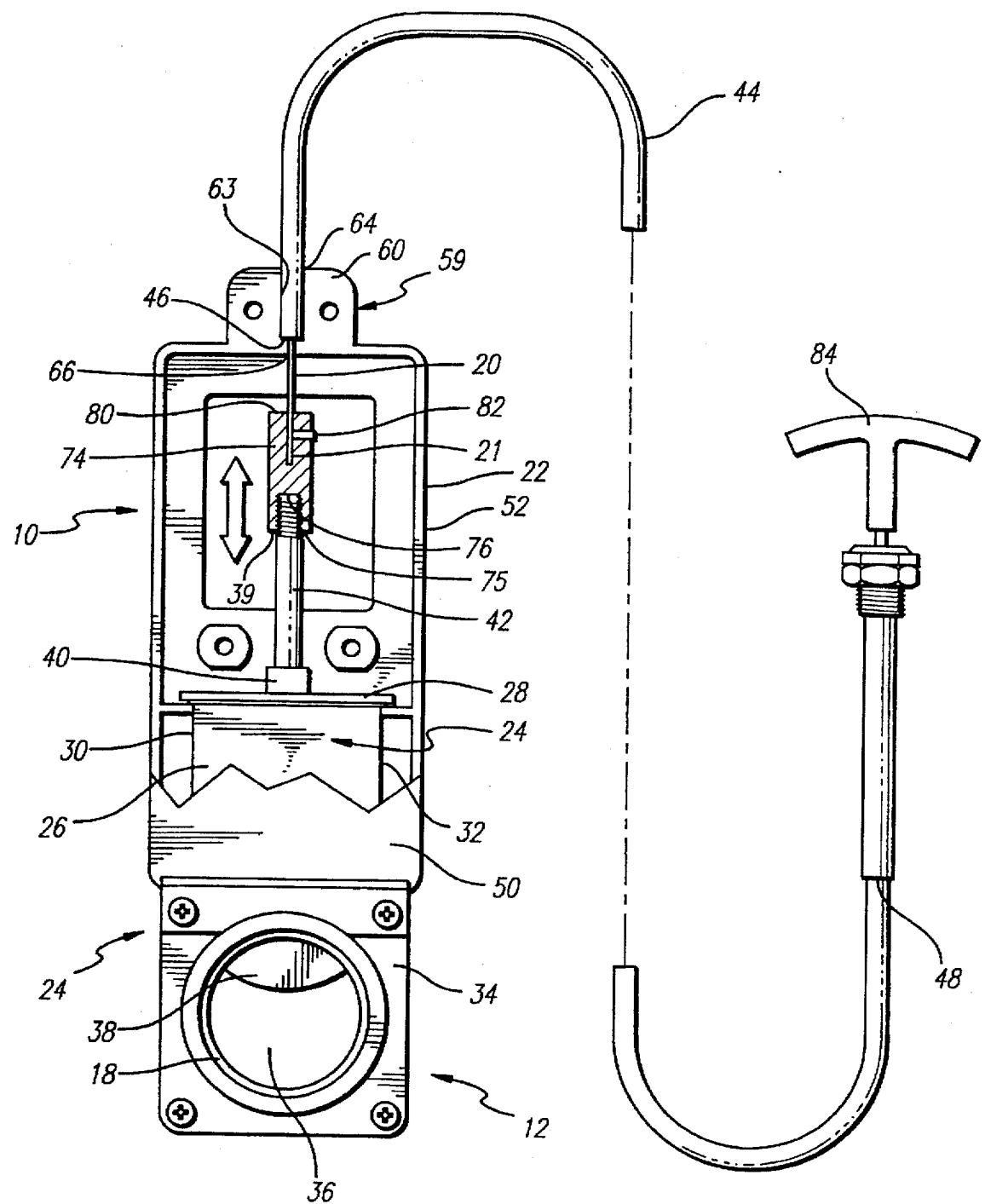
FIG. 2 is a front perspective view of the cable guide casing apparatus of the present invention with the gate in the open position.
Figure 3:
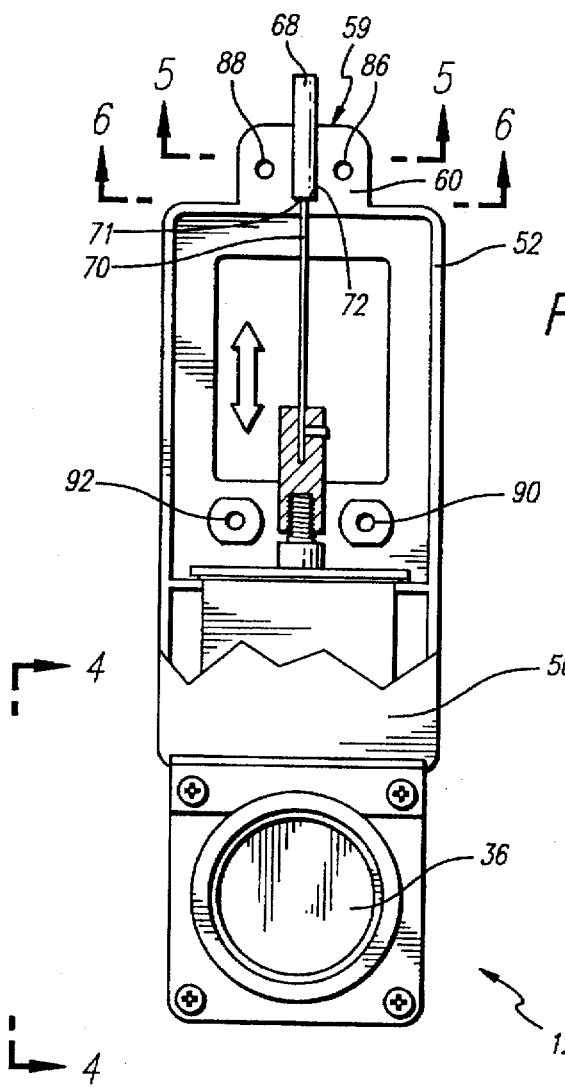
FIG. 3 is a front perspective view of the cable guide casing apparatus of the present invention with the gate in the closed position.
Figure 5:
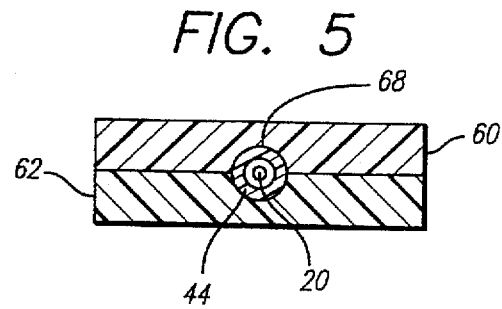
FIG. 5 is a cross-sectional view of the upper portion of the cable guide casing apparatus shown along lines 5—5 of FIG. 3 in accordance with the present invention.
Figure 6:
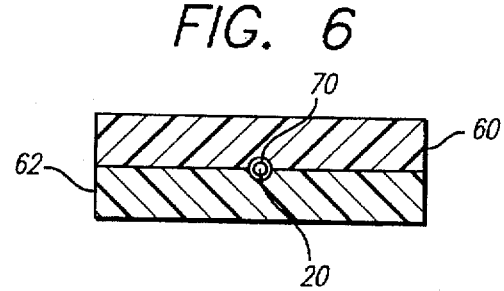
FIG. 6 is a cross-sectional view of the upper portion of the cable guide casing apparatus shown along lines 6—6 of FIG. 3 in accordance with the present invention.
Figure 4:
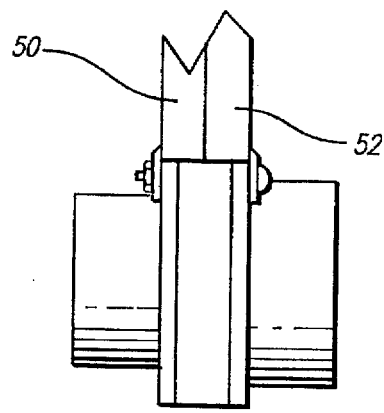
FIG. 4 is a side view of the lower portion of the valve housing shown along lines 4—4 of FIG. 3 in accordance with the present invention.

FIG. 2 illustrates the preferred embodiment of the device of the present invention, which is designated generally as 10. Device 10 is provided as the principal component of a valve construction 12, which is used as a means to control the discharge of waste from, for example, a recreational vehicle 11 ("RV") into a sewer or septic tank (not shown). Valve construction 12 has several essential components, including a gate valve 18, a cable 20 and a clamp assembly 22.

Gate valve 18 comprises a valve housing 24, which includes an upper housing member 26 having a top surface 28 and first and second sidewalls 30 and 32, respectively, and a lower housing member 34. A flow passageway 36 is contained within lower housing member 34. A valve closure member 38 is moveable transversely of the flow passageway 36 between the upper housing member 26, to cause the flow passageway 36 to open, and the lower housing member 34, to cause the flow passageway 36 to close. Attached to the upper stem 40 of the valve closure 38 is a valve push rod 42.

The axially moveable cable 20 is connected to the valve closure member 38 at one end 39 of the valve push rod 42. Cable 20 is employed to impart movement to the valve closure member 38 between the upper housing member 26 and lower housing member 34. Cable 20 is covered along almost its entire length by a sleeve 44, which is provided to impart strength to the cable 20 and act as a protective covering. Sleeve 44 includes a first end 46 and a second end 48 and is comprised of a resilient synthetic or natural material.

Clamp assembly 22 has a first clamp member 50 and a second clamp member 52, which are identical in both size and configuration. First and second clamp members 50, 52 are each adapted to be mounted face opposed to one another and attached to valve 24 housing using any conventional means for this purpose, such as, for example, a screw or a screw and nut combination inserted into holes 86, 88, 90 and 92.

Integrally formed at one end of clamp assembly 22 is a projecting neck component 59, comprising members 60, 62 joined together as corresponding elements of clamp members 50, 52, respectively. Neck members 60, 62, when joined, define a cavity 63 and entrance and exist passages 64, 66 therein through which the cable 20 is received. Cavity 63 is further defined by cylindrical channels 68, 70. Channel 68 receives cable 20 covered by sleeve 44, which has a diameter approximately the size of the diameter of channel 68. Channel 70 is designed to receive only the cable 20, which has a diameter approximately the same size as the diameter of channel 70. Juncture 71, where channels 68, 70 meet, forms a partial wall 72 against which the first end 46 of sleeve 44 abuts. This enables cable 20, when actuated at the second end 48, to move freely in a linear direction through channel 70 to impart movement to valve closure 38 between the upper housing member 26 and the lower housing member 34 to respectively open and close the flow passageway 36.

Attached to valve push rod 42 is a coupler 74 employed to join cable 20 with the valve push rod 42. Coupler 74, at the bottom end 75, is connected, either threadedly or in some other suitable fashion, to the end 76 of the valve push rod 42. End 21 of cable 20 is connected, using a pin 82 or some other appropriate means, to the top end 80 of coupler 74. This coupling enables cable 20 to push and pull coupler 74 and, in turn, impart the necessary movement to the valve closure 38.

Cable 20 covered by sleeve 44 may extend from 36 to 96 inches in length, depending on the needs of the user, the size and configuration of the vehicle and other relevant factors. This permits the gate valve 18 to be situated in a remote place relative to the location of the control handle 84, which is generally employed to operate the device. Control Handle 84 is commonly mounted along with the utility connections 85 inside a control box 86 located on the outside of the vehicle 11. Gate valve 18 is typically attached to the underbody of the vehicle 11 somewhere beneath and usually not too distant from waste discharge facilities, such as sinks, showers and toilets (not shown). Thus, for purposes of optimum convenience and to avoid the difficult and sometimes dirty process of having to crawl underneath the vehicle 11 to operate the gate valve 18, the control handle 84 is best located in a place outside the vehicle 11 most convenient for the operator.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

I claim:

1. In a valve construction for use with a holding or waste removal tank of a vehicle comprising, a gate valve having a valve housing, including an upper housing member, said upper housing including a top surface and first and second sidewalls, and a lower housing member a flow passageway through said lower housing member, a valve closure member moveable transversely of said flow passageway between said upper housing member, to cause said flow passageway to open, and said lower housing member, to cause said flow passageway to close, said valve closure member having a valve stem connected thereto, an axially moveable cable connected to said valve closure member at said valve stem to impart movement thereto, said cable having a sleeve member, said sleeve member having an end portion, to impart strength to and provide a protective covering for said cable, the improvement comprising a clamp assembly including a first clamp member and a second clamp member, each of said clamp members having generally identical physical characteristics and means adapted to align in opposing relationship and engage said upper housing member on either side thereof and engage said cable sleeve member to fixably secure between said clamp members, respectively, said upper housing member and said cable sleeve member, wherein said cable can be operated from a remote location at any desired angle of bend to engage said valve closure member and cause it to move back and forth within said valve housing.

2. The invention of claim 1 wherein said first clamp member and said second clamp member each includes a first annular groove portion adapted to form a first channel member for receiving and rigidly securing said end portion of said cable sleeve member therein and a second annular groove portion adapted to form a second channel member, situated nearly adjacent to said first channel member for slidably receiving said cable, said second channel member defining a wall abutment to engage and restrain said end portion of said cable sleeve member, for enabling said cable to operate in an axially slidable relationship with said sleeve to impart movement to said valve closure member.

* * * * *